April 16, 1957  G. E. CLARK  2,788,685
FLEXIBLE METAL SHRINKING OR EXPANDING TOOL
Filed May 26, 1954
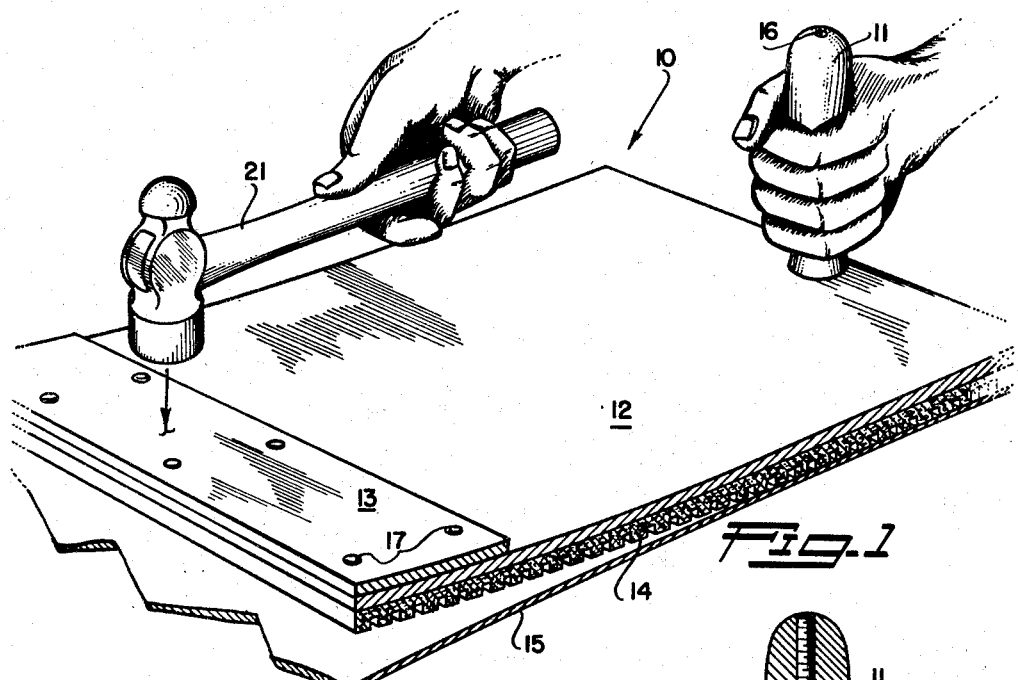
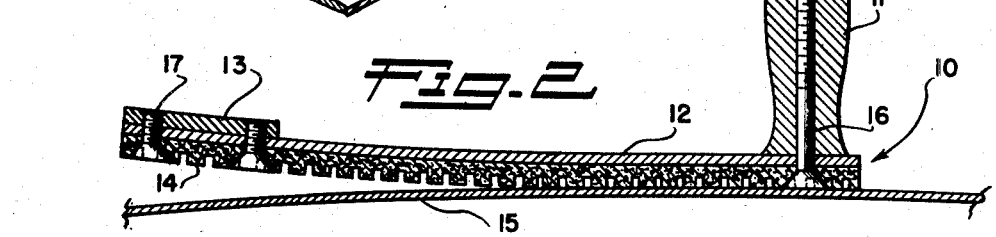
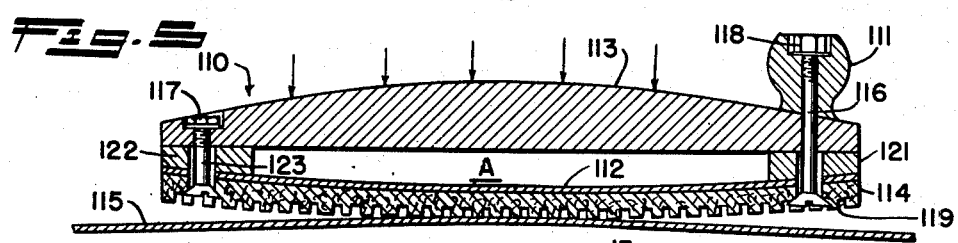
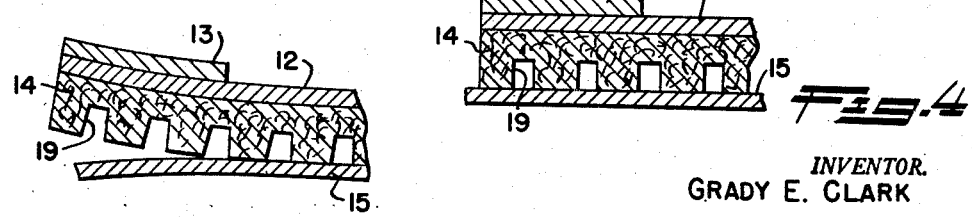
INVENTOR.
GRADY E. CLARK
BY
Agent

United States Patent Office 2,788,685
Patented Apr. 16, 1957

2,788,685

FLEXIBLE METAL SHRINKING OR EXPANDING TOOL

Grady Eugene Clark, Atlanta, Ga., assignor to Lockheed Aircraft Corporation, Burbank, Calif.

Application May 26, 1954, Serial No. 432,479

4 Claims. (Cl. 81—15)

This invention relates to a tool or device to be used to remove bulges, oil-can characteristics, and malformations and the like from metal.

In the forming of sheet metal in various shapes or configurations, undesirable after effects are often noted. For instance, in forming sheet metal in a platen press there often develops shrinkage or compression of the material with an attendant buckling or bulging therein due to the plastic flow characteristics of the rubber pad used as a female die in pressing the sheet metal over the forming blocks. This is especially true when thin sheets of the harder grades of aluminum alloys, or stainless steel, are to be formed.

The buckling or bulging of the metal sheet is a distortion of the metal from the desired form and may often lead to serious problems of joining or fitting of the part formed. For instance, in forming metal sheets into the contour required for utilization as a skin of an aircraft fuselage or wing surfaces, a buckle or bulge can bring about a misfit of the skin to the supporting ribs and longerons. It may also cause a non-mating of skin edge to skin edge when secured to the above mentioned ribs or longerons.

Another undesirable after effect of working with metal sheets develops when strips or lengths of metal are cut. A slight bend or curve often develops longitudinally of the piece and in the plane of the sheet. The degree of bend, distortion or warp, although not of a large magnitude, often causes parts such as brackets or braces, fabricated from the cut piece to be rejected on inspection or installation.

There are various ways of correcting for a buckle or oil-can effect in metal sheets which are crude and not too satisfactory. The buckles may be beaten out by using a mallet of a soft and yielding material, or heat can be used to relieve the buckling effect. The former method is slow, tedious and not too effective and the latter method is not acceptable.

To relieve an undesirable curve that may develop in narrow, rather long strips of metal as above described there are available mechanical tools, both power driven and manually operated for this particular situation. The tools, however, are limited as to the size of material or part they may accept, also they are large, bulky, expensive and require some degree of familiarity on the part of the operator for their satisfactory use.

An object of the present invention is to provide a tool for removing bulges or oil-can effects from metal sheets.

Another object of the present invention is to provide a tool for removing curves, bends, and warping effects from metal strips.

Still another object of the present invention is to provide a tool to perform the above mentioned operations that is readily portable and does not require a large amount of operating space.

A still further object of the present invention is to provide a tool that is inexpensive to manufacture and economical to maintain, that may be used to remove bulges, buckles, and oil-can effects from sheet metal and can also be used to remove curves, bends or warping in long metal strips.

Other objects of the invention will become readily apparent from the disclosures in the specification and in the accompanying drawings.

In the drawings—

Figure 1 is a perspective view of a device of the invention with an edge portion appearing in vertical cross section, and illustrating the manner of using the same;

Figure 2 is a vertical sectional view of the device;

Figure 3 is an enlarged vertical sectional view of a part of the device;

Figure 4 is a view similar to Figure 3 illustrating the operated position of the device; and Figure 5 is a sectional view of another embodiment of the present invention.

Referring to Figure 1 of the drawings the metal shrinking device or tool 10 is shown positioned on a metal sheet 15 from which a bulge, buckle, or oil-can effect is to be removed.

A handle 11 is provided at one end of the tool 10 and is secured to a flexible resilient mounting plate 12 by a handle mounting screw 16.

At the end of the tool 10, opposite the handle 11, a striking plate 13 is secured to the upper surface of the mounting plate 12. The attaching screws 17 of the striking plate 13 may serve as the means of securing the shrinking sheet 14 to the underside of the mounting plate 12. Ridges or serrations 19 are formed on the underside of the sheet 14 which is preferably red fiber, "Micarta," or like material, which will not mar the sheet metal 15 and will not slip thereon. The handle attaching screw 16 may assist in securing the shrinking sheet 14 to the mounting plate 12.

Figure 2 shows in detail the manner of securing the striking plate 13, the shrinking sheet 14, and the handle 11 to the mounting plate 12. It will be noted that the plate 12 and the sheet 14 carrying the ridges or serrations 19 initially or normally bend or curve in a direction away from the surface of the metal sheet 15, presenting a convex side toward the sheet 15.

Referring to Figure 3, the shrinking ridges, teeth or serrations 19 are shown exaggerated as to scale and in the position prior to operation of the tool. This view also clearly shows the spaces or grooves between the ridges 19 to be initially greater in width at their open ends having downwardly divergent walls. The ridges or serrations 19 are evenly spaced longitudinally of the sheet 14 and run transversely of the same.

Figure 4 of the drawings shows approximately the same portion of the tool 10 as is shown in Figure 3. However, in this view a force is indicated by arrows as being applied to the tool 10, said force being applied to the tool 10 through the area encompassed or defined by the striking plate 13. As will be noted, the shrinking serrations 19 are now flush against the metal sheet 15, and the open ends or mouths of the spaces between the serrations are now smaller in size than in Figure 3.

In Figure 5 a somewhat different embodiment of the present invention is shown. There are, however, many points of similarity which are apparent from the drawings and from the following description.

The metal shrinking device or tool 110 is shown positioned on a metal sheet 115. At one end of the tool 110 an upwardly projecting handle 111 is secured to the tool body or striking plate 113 by means of a handle mounting bolt 116 and nut 118. A flexible plate 112 is spaced below the plate 113 and the bolt 116 may assist in connecting the two plates.

Positioned between the striking plate 113 and the lower plate 112, at the end of the tool 110 supporting the handle 111, is a handle spacer 121. At the end of the tool 110 opposite the handle 111 is a second bolt 123. This bolt 123 is inserted through openings in the striking plate 113, a spacer 122, the lower plate 112 and the shrinking plate 114 and is provided with by a nut 117.

The tool 10, when used for its designed purpose, is placed on the metal sheet 15 where a bulge or oil-can effect is noted. By observing Figure 1 the method of handling the tool 10 is evident.

Force in the form of blows from a hammer or mallet 21 is applied to the area of the tool as indicated at 13. Under the effects of the hammer 21 the portion of the tool 10 which normally curves up and away from the metal sheet 15 is forced down until the shrinking ridges 19 of the tool 10 forceably contact the metal sheet.

In the foregoing description a hammer 21 is indicated as the means of applying force to the tool 10, however there is no intention to limit the invention to this particular means of apply motivating force as it is quite obvious any other sort of suitable mechanical means may be utilized.

In Figure 3, the positions of the shrinking serrations 19 above described are more clearly indicated, particularly as to the appearance and relaxed outline of the serrations. It will be noted that the open ends of the spaces between the serrations 19 are larger than the closed ends and that the side surfaces of the serrations are downwardly divergent.

As above described, force is applied to the shrinking tool 10 so that the ridges or serrations 19, as shown in Figure 4 are forced against the metal sheet 15 to have their sharp corners act on the sheet.

The spaces between the active ends of the serrations 19 have now become smaller and the serrations are exercising a gathering or squeezing action on the surface of the metal sheet 15. This action draws the excess metal of the bulge inwardly, lessening the degree of the bulge or oil-can effect and, consequently, leaving the surface of the metal sheet 15 flat.

The resilience or spring-back action of the material from which the tool 10 is constructed will, as soon as the force above mentioned is removed, allow the tool 10 to reassume its original concave or curved form, as shown in the drawings.

The above described action may be repeated as often as necessary or desired in order to obtain the degree of flatness required.

It can be readily seen from the foregoing explanation of the principle involved and the operation of the device that the tool 10 can be used as a metal expander. It is apparent that the flexible plate 12 and the plate carrying the ridges or serrations 19 may be constructed to present a concave side toward the work or sheet 15 so that when the tool is placed against the skin 15 and struck by a hammer or the like the action of the serrations 19 tends to expand or stretch the skin 15.

Although the description and the drawings show the tool 10 as being used to reduce bulges or oil-can effects from metal sheets, it is apparent that the tool 10 and the principle involved may be used on various sizes and widths of metal, particularly in instances where slight curves or distortions of a like nature are to be corrected.

In the foregoing description there has been no mention of the material used in the fabrication of the tool 10 as a choice of a wide variety of materials is quite possible.

Having thus described the invention and the present preferred embodiments thereof, it is desired to emphasize the fact that many modifications may be resorted to in a manner limited only by a just interpretation of the following claims.

I claim:

1. In a device of the character described, a flexible resilient mounting plate, a coextensive flexible fibrous-material plate secured in face to face relationship to the said mounting plate, the two plates being transversely curved, said second named plate presenting a series of serrations spaced longitudinally thereof and running transversely of the plates.

2. In a device of the class described, a bowed flexible resilient plate presenting an extensive convex under side, a plurality of spaced ridges on the under side of said plate extending generally parallel with the axis of curvature of the bowed plate, a handle secured to the upper side of the plate adjacent one end of the plate, and a force receiving means on the upper side of the plate adjacent the other end of the plate.

3. A device of the character described including a flexible resilient plate-like member transversely bowed to present a concave side and a convex side, spaced serrations on one of said sides substantially parallel with the axis of curvature of the bowed member, said serrations presenting sharp work engaging corners, a handle on the other side of the member, and an impact force receiving part on said other side of the member spaced from the handle.

4. A metal working tool comprising a flexible resilient plate-like member bowed throughout a substantial portion and generally about an axis to present a convex side and a concave side, a flexible plate of slippage-resistant material secured in face to face relationship to the convex side of the member, said second named plate having a plurality of spaced work engaging serrations extending generally parallel with said axis, and means on the concave side of the member for receiving a force to flex the member toward a flat condition and thus move the work engaging serrations toward one another.

References Cited in the file of this patent

UNITED STATES PATENTS

| | | |
|---|---|---|
| 2,428,173 | Moore | Sept. 30, 1947 |
| 2,447,162 | Conrad | Aug. 17, 1948 |
| 2,633,766 | Staszak et al. | Apr. 7, 1953 |
| 2,670,527 | Roper | Mar. 2, 1954 |

FOREIGN PATENTS

| | | |
|---|---|---|
| 685,402 | Great Britain | Jan. 7, 1953 |